United States Patent
Vanstone

(10) Patent No.: US 7,424,504 B2
(45) Date of Patent: *Sep. 9, 2008

(54) ARITHMETIC PROCESSOR FOR ACCOMODATING DIFFERENT FIELD SIZES

(75) Inventor: Scott A. Vanstone, Campbellville (CA)

(73) Assignee: Certicom Corp., Mississauga (CA)

( * ) Notice: Subject to any disclaimer, the term of this patent is extended or adjusted under 35 U.S.C. 154(b) by 686 days.

This patent is subject to a terminal disclaimer.

(21) Appl. No.: 10/837,749

(22) Filed: May 4, 2004

(65) Prior Publication Data

US 2005/0044124 A1 Feb. 24, 2005

Related U.S. Application Data

(60) Continuation of application No. 10/023,934, filed on Dec. 21, 2001, now Pat. No. 6,735,611, which is a division of application No. 09/418,217, filed on Oct. 14, 1999, now Pat. No. 6,349,318, which is a continuation of application No. PCT/CA98/00467, filed on Apr. 20, 1998.

(30) Foreign Application Priority Data

Apr. 18, 1997 (GB) .................................. 9707861.2

(51) Int. Cl.
*G06F 7/00* (2006.01)
(52) U.S. Cl. ..................................................... 708/492
(58) Field of Classification Search .................. 708/492
See application file for complete search history.

(56) References Cited

U.S. PATENT DOCUMENTS 4,216,531 A  8/1980  Chiu (Continued)

FOREIGN PATENT DOCUMENTS

DE   698 11 877.4   12/2003

(Continued)

OTHER PUBLICATIONS

Fuchs, K.C. "Cryptographic Signal Processor" Motorola Technical Developments, vol. 27, May 1, 1996, pp. 81-82, XP000594566.

(Continued)

*Primary Examiner*—Tan V Mai
(74) *Attorney, Agent, or Firm*—John R S. Orange; Brett J. Slaney; Blake, Cassels & Graydon LLP

(57) ABSTRACT

An arithmetic processor is provided, which comprises an arithmetic logic unit (ALU) containing arithmetic circuitry configured to perform field operations in an underlying field. The circuitry comprises a first controller for sequencing the ALU through steps in the field operations. The processor also comprises a register file comprising one or more general purpose registers to contain representations of one or more operands, and a second controller to provide instructions to the ALU for controlling computational operations of the ALU on the one or more operands. The second controller co-operates with the first controller to control operations of the ALU to accommodate different operand vector sizes in response to variations in size of the underlying field indicated by a field size control signal received by the second controller. The first controller monitors control bits and implements a counter in its own control registers for determining the size of a field being used.

11 Claims, 11 Drawing Sheets

U.S. PATENT DOCUMENTS

| | | |
|---|---|---|
| 4,644,466 A | 2/1987 | Saito |
| 4,888,778 A | 12/1989 | Brechard et al. |
| 5,077,793 A | 12/1991 | Falk et al. |
| 5,227,992 A | 7/1993 | Lee et al. |
| 5,235,614 A | 8/1993 | Bruckert et al. |
| 5,268,854 A | 12/1993 | Ikumi |
| 5,313,530 A | 5/1994 | Iwamura |
| 5,459,681 A | 10/1995 | Harrison et al. |
| 5,467,297 A | 11/1995 | Zook |
| 5,467,476 A | 11/1995 | Kawasaki |
| 5,497,423 A | 3/1996 | Miyaji |
| 5,555,516 A | 9/1996 | Zook |
| 5,577,069 A | 11/1996 | Lau et al. |
| 5,612,910 A | 3/1997 | Meyer |
| 5,627,855 A | 5/1997 | Davidovici |
| 5,627,893 A | 5/1997 | Demytko |
| 5,638,069 A | 6/1997 | Rensink et al. |
| 5,737,424 A | 4/1998 | Elteto et al. |
| 5,787,028 A | 7/1998 | Mullin |
| 5,854,759 A | 12/1998 | Kaliski, Jr. et al. |
| 5,859,875 A | 1/1999 | Kato et al. |
| 5,982,895 A | 11/1999 | Dworkin et al. |
| 5,999,959 A | 12/1999 | Weng et al. |
| 6,003,057 A | 12/1999 | Dworkin et al. |
| 6,009,450 A | 12/1999 | Dworkin et al. |
| 6,049,815 A | 4/2000 | Lambert et al. |
| 6,199,086 B1 | 3/2001 | Dworkin et al. |
| 6,230,179 B1 | 5/2001 | Dworkin et al. |
| 6,266,717 B1 * | 7/2001 | Dworkin et al. ............... 710/51 |
| 6,349,318 B1 | 2/2002 | Vanstone et al. |
| 6,735,611 B2 | 5/2004 | Vanstone |

FOREIGN PATENT DOCUMENTS

| | | |
|---|---|---|
| EP | 0169908 A1 | 2/1986 |
| EP | 0 267 836 A | 10/1987 |
| EP | 0 976 027 B1 | 3/2003 |
| JP | 63-082513 A | 9/1986 |
| JP | 05-068032 A | 3/1993 |
| JP | 08-036594 A | 7/1994 |
| JP | 06-268530 A | 9/1994 |
| WO | WO 98/48345 | 10/1998 |
| WO | WO 99/44329 | 9/1999 |

OTHER PUBLICATIONS

Hsu, I. S. et al.; "A Comparison of VLSI Architecture of Finite Field Multipliers Using Dual, Normal or Standard Bases"; IEEE Transactions on Computers: Jun. 1, 1988; pp. 735 to 739; vol. 37, No. 6; IEEE Inc.; New York, US: XP000576196 ISSN: 0018-9340.

De Win E. et al.: "A Fast Software Implementation for Arithmetic Operations in GF(2)"; Lecture Notes In Computer Science: 1996: pp. 65 to 76; Springer Verlag: New York, US; XP002081362 ISSN: 0302-9743.

* cited by examiner

ARITHMETIC PROCESSOR FOR ACCOMODATING DIFFERENT FIELD SIZES

This application is a continuation of U.S. patent application Ser. No. 10/023,934 filed on Dec. 21, 2001 now U.S. Pat. No. 6,735,611 which is a division of U.S. patent application Ser. No. 09/418,217 filed Oct. 14, 1999 now U.S. Pat No. 6,349,318, which is a continuation application of PCT International Application No. PCT/CA98/00467 filed Apr. 20, 1998, which claimed priority of Great Britain Application No. 9707861.2 filed Apr. 18, 1997, the contents of each of which are incorporated herein by reference.

The present invention relates to a method and apparatus for performing finite field and integer arithmetic.

BACKGROUND OF THE INVENTION

Elliptic Curve (EC) cryptography over a finite field requires the arithmetic operations of addition, multiplication, squaring and inversion. Additionally, subtraction operations are also required if the field is not of characteristic two. Modular arithmetic operations are also required, for example in computing signatures, however these operations are required less frequently than the finite field operations. EC cryptography as an example, requires the full complement of modular and finite field operations, addition, subtraction, multiplication and inversion.

Field sizes for cryptography tend to be relatively large, requiring fast, dedicated processors to perform the arithmetic operations in an acceptable time. Thus there have been numerous implementations of either fast modular arithmetic processors or dedicated processors for performing arithmetic operations in $F_{2^n}$. The use of special purpose or dedicated processors is well known in the art. These processors are generally termed coprocessors and are normally utilized in a host computing system, whereby instructions and control is provided to the compressor from a main processor.

Traditionally RSA was the encryption system of choice, however with the advent of superior and more secure EC cryptography the need for processors that perform modular exponentiation exclusively is becoming less imperative. However, while users are in transition from RSA cryptography to EC cryptography there is a need for an arithmetic processor that supports both these operations, with little or no penalty in performance and cost.

SUMMARY OF THE INVENTION

It is an object of the present invention to obviate or mitigate some of the above disadvantages.

In accordance one aspect of the present invention there is provided an arithmetic processor comprising:
 a) an arithmetic logic unit to perform field operations in an underlying finite field;
 b) at least one register to contain a representation of an operand; and
 c) a control unit to control operations of said arithmetic logic unit on said operand.

The register has at least one control bit in a predetermined location in the register and co-operates with the arithmetic logic unit to compensate for variations in the size of the underlying finite field.

In accordance with a further aspect of the present invention there is provided an arithmetic processor for performing cryptographic operations comprising a first arithmetic logic unit for performing finite fields operations, a second arithmetic logic unit for performing a different cryptographic operation and a set of registers to hold representations of operands to be operated upon by the arithmetic logic unit during the cryptographic operations. The set of registers is operably connected to each of the arithmetic logic units for making the contents of the registers available to one of the arithmetic logic units.

In accordance with a yet further aspect of the present invention, there is provided an arithmetic processor for performing finite field operations and including an arithmetic logic unit having a finite field arithmetic circuit comprising a finite field multiplier circuit having a plurality of registers for receiving representations of first and second operands and a further register for receiving a representation of a modulus and an accumulator for containing a finite field product of the operands, logic circuitry for establishing connections from respective cells of the registers to the accumulator and a sequencing controller operatively associated with the registers and the logic circuit for implementing a sequence of steps to derive the finite field product.

In accordance with a still further aspect of the present invention, there is provided an arithmetic processor comprising:
 a) an arithmetic logic unit having a plurality of arithmetic circuits each for performing a group of associated arithmetic operations, the arithmetic logic unit having an operand input data bus for receiving operand data thereon and a result data output bus for returning the results of the arithmetic operations thereon;
 b) a register file coupled to the operand data bus and the result data bus; and
 c) a controller coupled to the arithmetic logic unit and the register file, the controller selecting one of the plurality of arithmetic circuits in response to a mode control signal requesting an arithmetic operation and for controlling data access between the register file and the arithmetic logic unit and whereby the register file is shared by the arithmetic circuits.

In accordance with another aspect of the present invention, there is provided an arithmetic processor for performing cryptographic operations comprising:
 a) an arithmetic logic unit to perform field operations in an underlying finite field, the arithmetic logic unit having a special purpose register to contain an operand and an accumulating register, the accumulating register being coupled to the special purpose register to receive the operand therefrom;
 b) a register file coupled to the special purpose register to provide the operand thereto, and thereby provide the operand to the accumulating register; and
 c) a control unit to control operations of the arithmetic logic unit on the accumulating register;

the special purpose register cooperating with the arithmetic logic unit to compensate for variations in the size of the underlying finite field.

In accordance with yet another aspect of the present invention, there is provided an arithmetic processor for performing cryptographic operations comprising:
 a) an arithmetic logic unit perform field operations in an underlying finite field;
 b) a register file coupled to the arithmetic logic unit to provide an operand thereto;
 c) a first control signal indicative of the size of the finite field;
 d) a second control signal indicative of an operation; and e) a controller to provide the control signals to the arithmetic logic unit and thereby perform the operation and compensate for variations in the size of the finite field.

BRIEF DESCRIPTION OF THE DRAWINGS

Embodiments of the invention will now be described by way of example only with reference to the accompanying drawings in which.

DETAILED DESCRIPTION OF A PREFERRED EMBODIMENT

Figure 1:
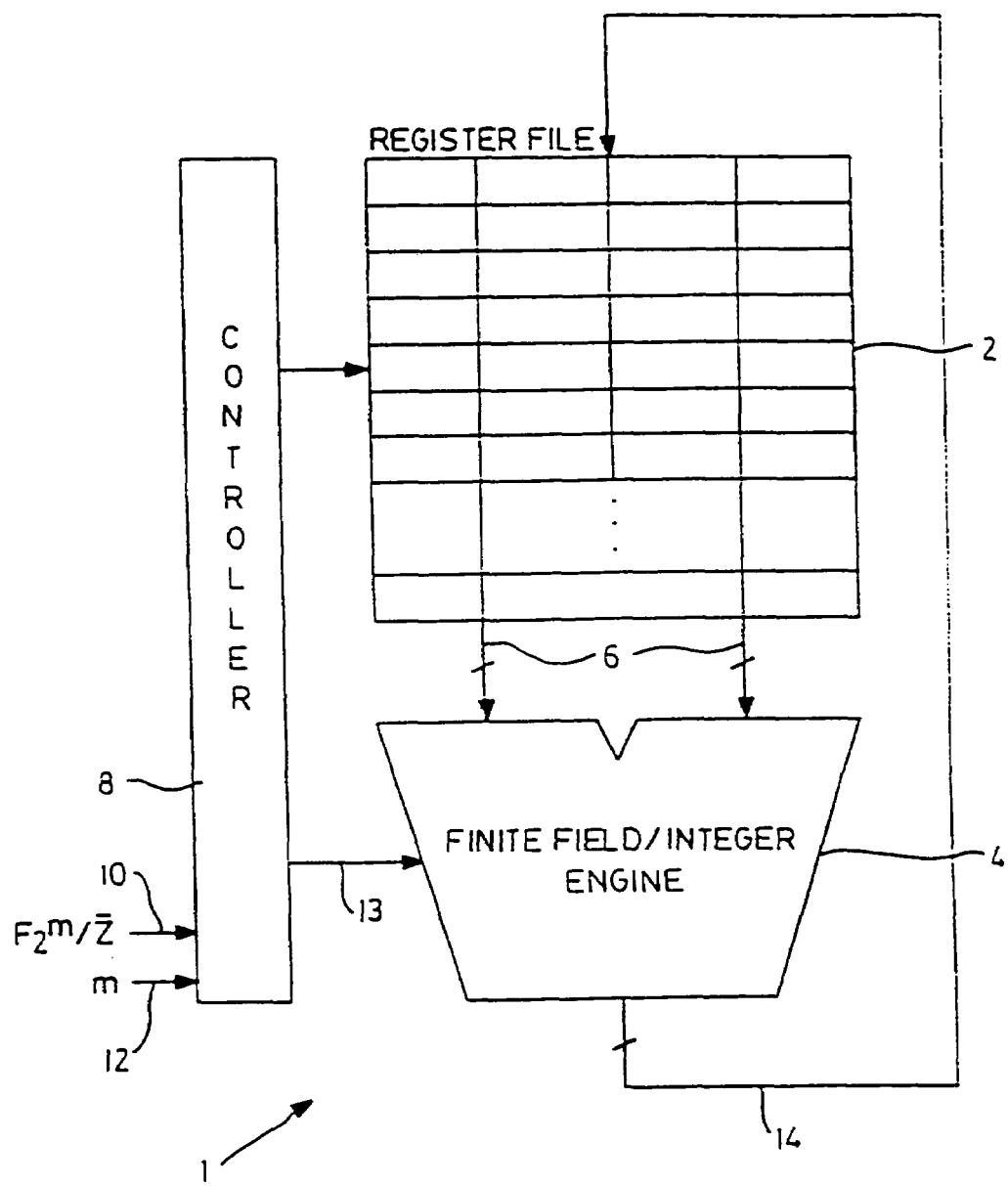
FIG. 1 is a block diagram of an arithmetic processor architecture for performing finite field arithmetic and integer arithmetic.

Referring to FIG. 1, an embodiment of an arithmetic processor is shown generally by numeral 1. As will be appreciated it may be used alongside a general purpose processor in an integrated computing system, where data is exchanged between the computing system and the arithmetic processor. The arithmetic processor includes a group of general purpose registers 2, termed a register file (which may be used as intermediate storage for EC point additions, point doublings, etc.), which communicate with an arithmetic-logic unit (ALU) 4, via data input buses 6. The ALU 4 includes shared finite field and integer arithmetic circuitry. A data output bus or result bus 14 is provided from the ALU 4 to the register file 2 for writing results of computations performed in the ALU 4 to the register file 2.

Computational operations of the ALU 4 is controlled via micro-programmed instructions residing in a controller 8 section of the arithmetic processor 1. A mode selection control 10 is provided to select between either finite field computations or modular integer computations. A field size control 12 is also provided for initializing the ALU 4 to accommodate different operand vector sizes. Thus the controller 8 performs the following tasks amongst others: provides the appropriate arithmetic mode and operation to the ALU 4; coordinates data access between the register file 2 and the ALU 4; and provides to the ALU 4 the appropriate field size to be used.

The general-purpose registers are chosen to have a width large enough to handle at least the largest foreseeable $F_{2^n}$ EC cryptosystem. The registers may be combined to support larger lengths required for integer modular arithmetic. For example if a single register in the register file 2 is 512 bits wide, then four registers may be used to provide storage for a single 2048-bit RSA quantity. The GP registers are loaded with a block, e.g. 2048-bit, computation may be performed in blocks and then reassembled to obtain the full width result. Typically the arithmetic processor 1 is utilized in an existing host computer system and the controller 8 receives control signals from the host system and communicates data to the host data bus via a suitable host bus interface. Details of such an interface are well known in to those skilled in the art and will not be discussed further.

Figure 2:
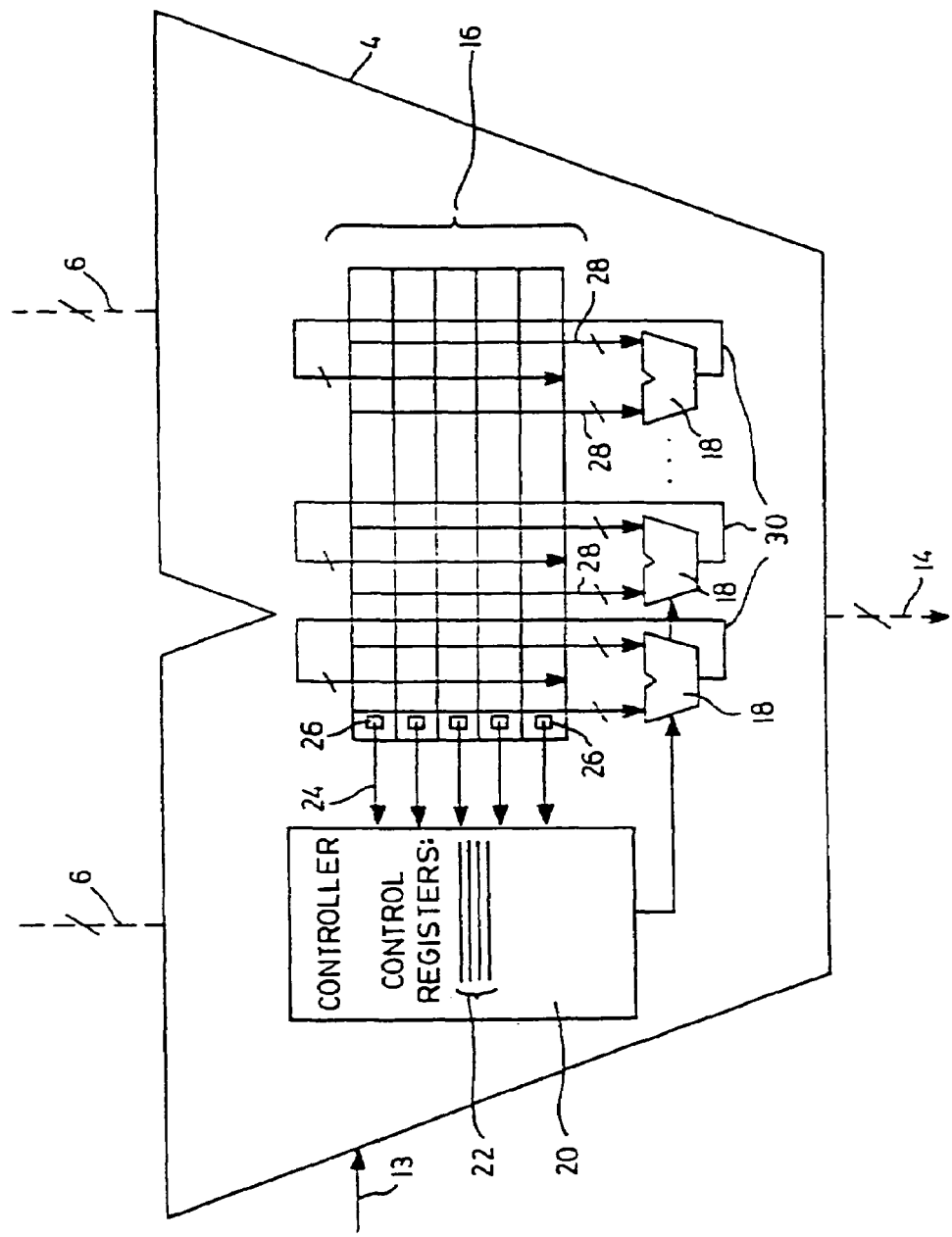
FIG. 2 is a block schematic diagram of the arithmetic logic unit ALU shown in FIG. 1.

Turning now to FIG. 2, the ALU 4 includes several special purpose registers 16, combinatorial logic and arithmetic circuitry contained in a plurality of sub-ALU's 18, operate on one or more bits input data buses 28 to each of the sub ALU's from the special purpose registers; output data buses 30 to the special purpose registers 16 from the sub ALU's 18 and its own controller 20. The controller 20 performs the following tasks amongst others: sequences the ALU 4 through steps in a computational operation: monitors control bits from the special purpose registers 16; and implements a counter n its own control registers 22 for determining the size of a field being used, a feature which allows the processor 1 to be used for different field sizes without having to redesign the processor hardware. In order to provide these functions, the control bits 26 of the special purpose registers 16 are provided as control bit inputs 24 to the controller 20. The special purpose registers 16 are all individually addressable. The controller 20 also controls data input via the input buses 6 from and to the register file to the sub ALU's 16 or the special purpose registers 16. These sub-ALU's may operate on single bits at a time. Each of these components will be described in more detail below.

Figure 3:
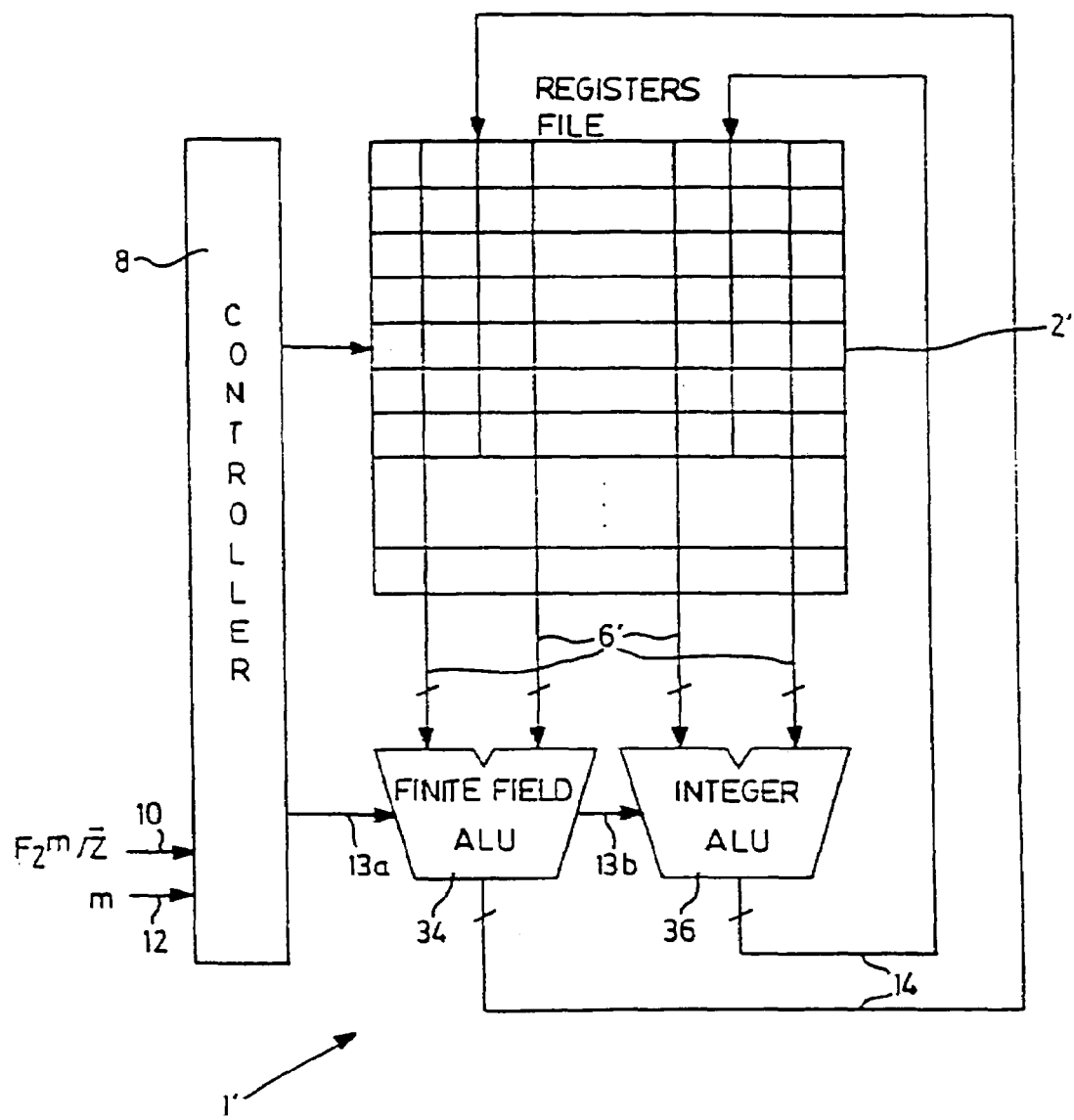
FIG. 3 is a block diagrams of an alternative embodiment of an arithmetic processor architecture for performing finite field arithmetic and integer arithmetic.

Referring to FIG. 3, an alternative embodiment of an arithmetic processor is shown generally by numeral 1'. In this embodiment a separate finite field unit 34 and integer modular arithmetic unit 36 is provided. This processor also includes a register file 2', data input buses 6', data output buses 14', and a controller 8', however, separate controls 13a and 13b are provided from the controller 8' to respective ALUs 34 and 36 respectively.

Figure 4:
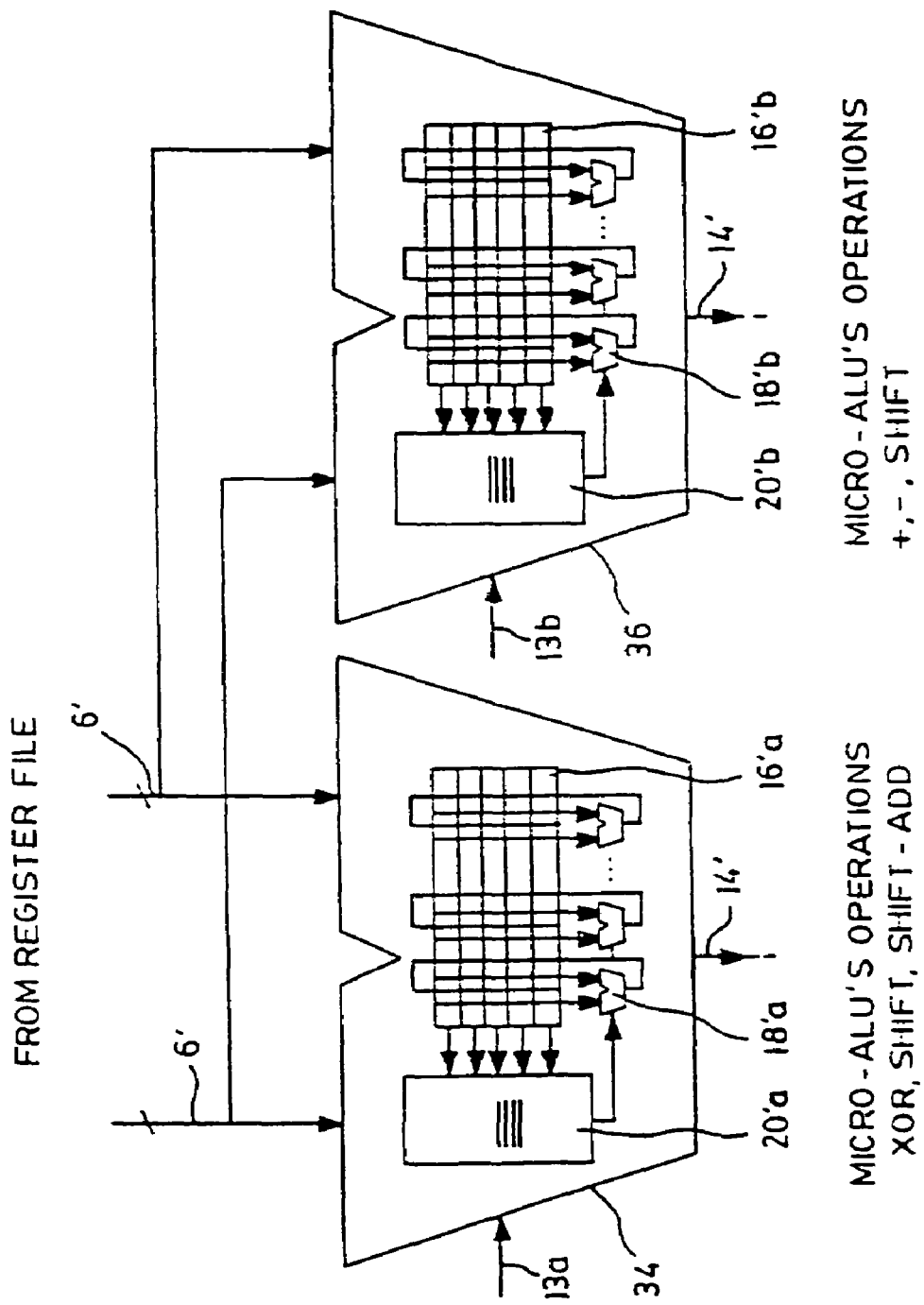
FIG. 4 is a block schematic diagram of the ALU shown in FIG. 3.

Referring to FIG. 4, the ALU's 34 and 36 of FIG. 3 are shown in greater detail. Each of the ALU's 34 and 36 include their own respective special-purpose registers 16'a and 16'b and controller 20'a and 20'b. Each of the ALU's 34 and 36 contain their own sub ALU's 18'a and 18'b respectively. Thus it may be seen that in this embodiment special purpose registers 16'a and 16'b and arithmetic and control circuitry is not shared. One or more of the sub ALU's 18'a perform in concert the functions of Shift left/right, XOR-shift and one or more of the sub ALU's 18'b perform in concert the function of integer add and integer subtract, with the option of using carry save techniques, or carry propagation.

Referring back to FIG. 2, the sub ALU's 18 perform the following logical functions on operands provided from the special purpose registers 16: XOR; Shift left/right, XOR-shift, integer add and integer subtract. These functions may be contained in one sub ALU 18 or across multiple sub ALUs. By providing multiple sub ALU's 18 the processor is capable of performing multiple operations, (e.g. for finite field inversion), simultaneously.

Figure 5A:
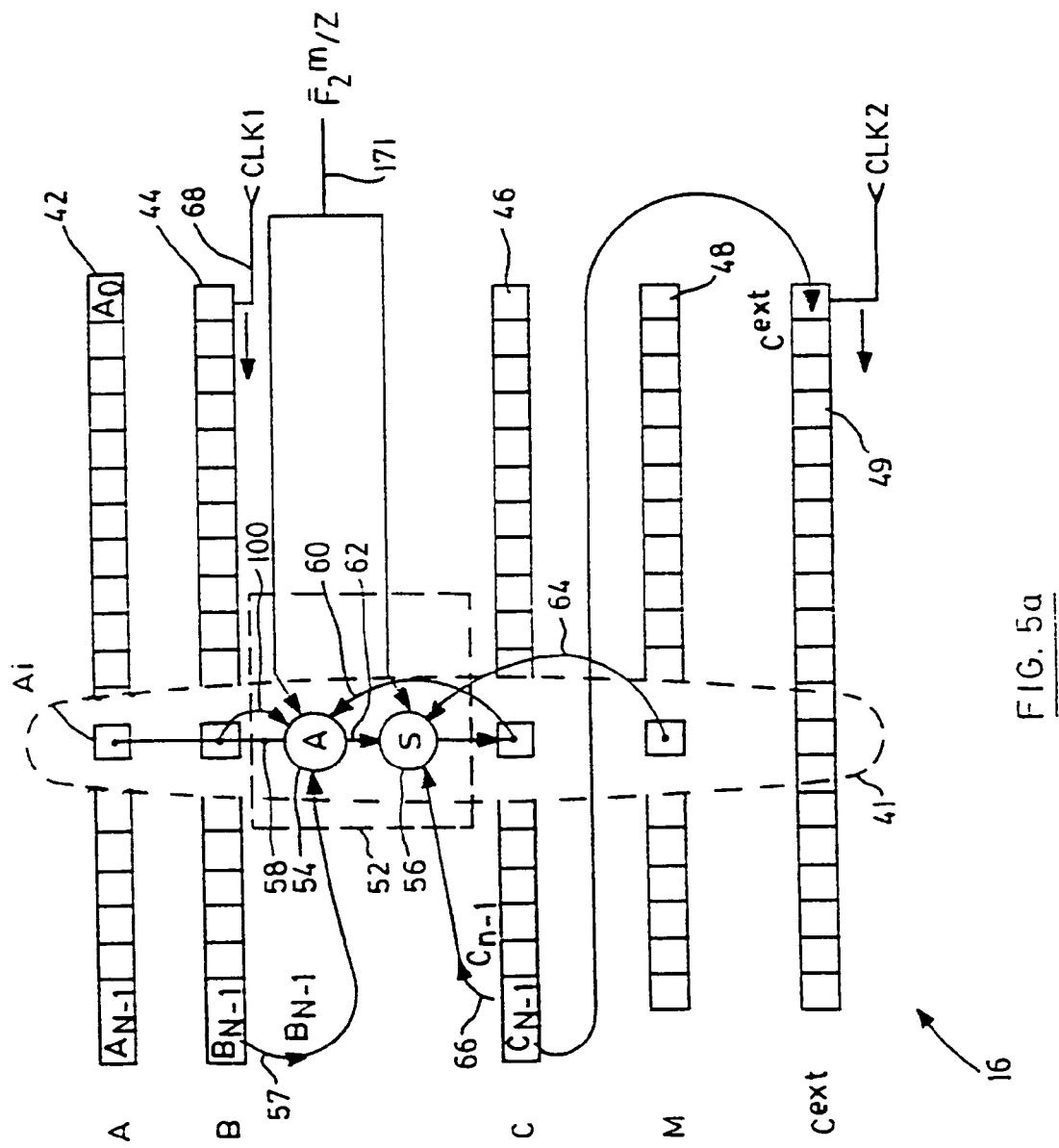
FIGS. 5(a), (b) and (c) are block diagrams of an embodiment of a bit-slice of the ALU shown in FIG. 2.
Figure 5C:
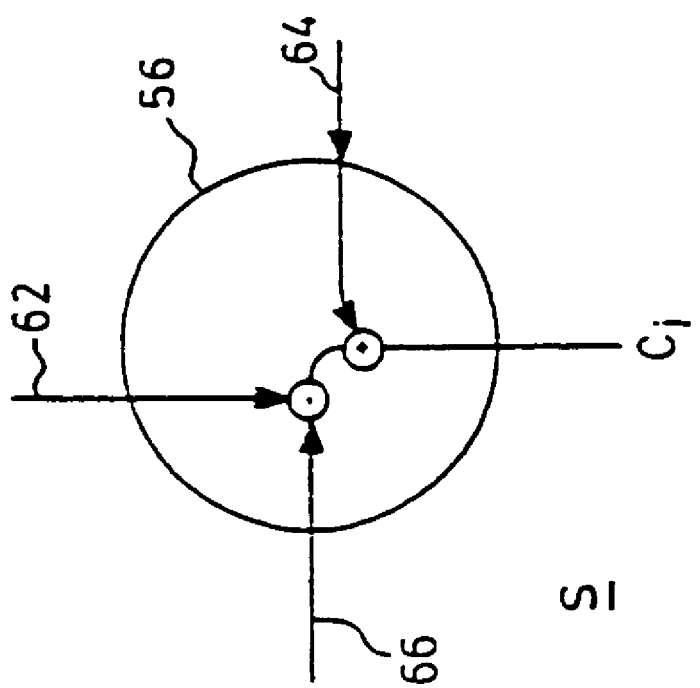
Figure 5B:
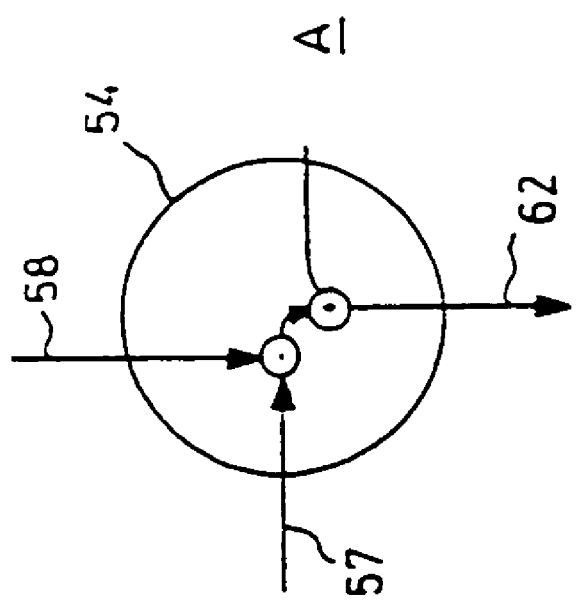

Turning now to FIG. 5, a bit-slice 41 of the ALU 4 shown in FIG. 2 is shown in greater detail. In the following discussion, we shall refer to the interconnection of cells of respective special-purpose registers in conjunction with its associated logic circuitry as a bit-slice 41. The logic circuitry contained in a bit slice is generally represented schematically by one of the sub ALU's 18 as shown in FIG. 2. It is then intended that the configuration of a bit slice may be repeated N times for an N-bit register. Furthermore, for clarity, we define N to be the number of cells in a register, and we refer to individual cells in a register as, for example, $A_i$ where $0 \leq i \leq N-1$ and wherein $A_{N-1}$ is the right most cell of the special-purpose register. The contents of a register will be referred to by lower case letters, for example, a bit vector A of length n will have bits numbered from $a_0 \ldots a_{n-1}$ with $a_0$ being the LSB. It may also be noted that although the special-purpose registers have been given specific names, these registers may take on different functions depending on the arithmetic operation being performed as will be described below.

In FIG. 5, the special-purpose registers 16 include: a pair of operand registers A 42 and B 44, to hold, for example, the multiplicand and multiplier, respectively, in a multiplication operation; an accumulator register C 46; a modulus register N 48; and a carry extension register $C^{ext}$ 50 (used in integer arithmetic). The registers each have N cells for holding the respective binary digits of bit vectors loaded therein. It is preferable that these registers are shift registers. A sub ALU 18 shown in FIG. 2 may be implemented by the circuitry of block 52 in FIG. 5, and in a manner to be described below.

Multiplication

Operation of the ALU 4 may be best understood by reference to a specific arithmetic operation such as finite field multiplication. Consider the product C of two elements a and b, where a and b are bit vectors and wherein b will be of the form $b=(b_0, \ldots b_{n-1})$ in polynomial basis representation and a will be of the form $a=(a_0, \ldots a_{n-1})$ in polynomial basis representation. A modulus bit vector m has the form $m=(m_0, \ldots m_n)$. As will be noted the modulus register has one bit more than the number of bits required to represent the modulus. Alternatively, since the most significant bit $m_n$ is one, this bit might be implied and m represented by $(m_0, \ldots m_{n-1})$. In $F_2^n$, the multiplication may be implemented as a series of steps, which is more clearly set out by the following pseudo-code:

```
C = 0 {C_-1=0}
For i from n-1 to 0 do
    For j from n-1 to 0 do
        For j from n-1 to 0 do {c_j = c_{j-1} + b_i a_i + c_{n-1} m_j}
```

In performing the multiplication, partial products of the multiplicand and each of the bits of $b_i$ of the multiplier, proceeding from the most significant bit (MSB) to the least significant bit (LSB), are formed. The partial products are reduced by the modulus if the MSB of the previous partial product is set.

Multiplication may be implemented by sequentially using a 1×N multiplier in which case the inner "for" loops of the preceding pseudocode is done in parallel. The modulus register M is loaded with the modulus bit vector m stripped of its most significant bit $m_n$ such that each cell contains a respective one of the binary digits $m_i$. In the implementation shown, the bits $m_i$ are arranged from left to right with the MSB of the vector being the leftmost bit, i.e. cell $M_{n-1}$ contains bit $M_{n-1}$. If $N \neq n$ still bit $M_{n-1}$ is stored in $M_{n-1}$, that is the data is left justified. The shift registers A and B are loaded with the finite field elements bit vectors a and b respectively so that each cell contains one of the binary digits $a_i$ or $b_i$. The finite field elements a and b are stored left justified, in their respective registers so that the topmost bit of the multiplier register b is always available at the left boundary cell bit, i.e. $(a_{n-1}, a_{n-2}, \ldots a_0)$ and $(b_{n-1}, b_{n-2}, \ldots b_0)$. If the length of the vectors a and b are less than the length of the registers; the remaining cells are padded with zeros. The above is generally performed by the controller 20 shown in FIG. 2. Other arrangements of sequential multiplication are possible (such as sequentially reducing the multiplicand), but such arrangements do not allow flexible field sizes along with fixed control bit locations. Bit ordering from LSB to MSB is also possible with corresponding changes in the multiplication algorithm.

A bit-slice 41 of the ALU4 for implementing multiplication in a finite field is now described. The bit-slice 41 includes first and second controllable adders 54 and 56, respectively, each having an XOR function. The topmost cell $B_{N-1}$ of the register B provides an add control signal $b_{n-1}$ 57 to the first adder 54. Inputs 58 and 60 to the first adder 54 are derived from a register cell $A_i$ and accumulator cell $C_i$. An output 62 from the first adder 54 is connected to an input of the second adder 56 along with an input 64 from the modulus register cell $M_i$. The adder 54 performs the operation output 62 equal to input 60+ (input 58 and control 57) is shown in greater detail in FIG. 5(b).

The output from the second adder 56 is then connected the accumulator cell $C_i$. A second add control signal 66 is derived from the topmost cell $C_{N-1}$ of the accumulator C 46. It may be seen that this signal implements the modular reduction of the partial product in the accumulator C by the modulus vector m, when the topmost bit $C_{N-1}$ of C is set. The adder 56 performs the operation output=input 62+(input 64 and control 66) as shown in greater detail in FIG. 5(c). The B register is a clocked shift register. A clock signal CLK1 68, which may be provided by the controller 20 causes the contents of this register to be shifted left for each partial product, calculated.

Figure 6:
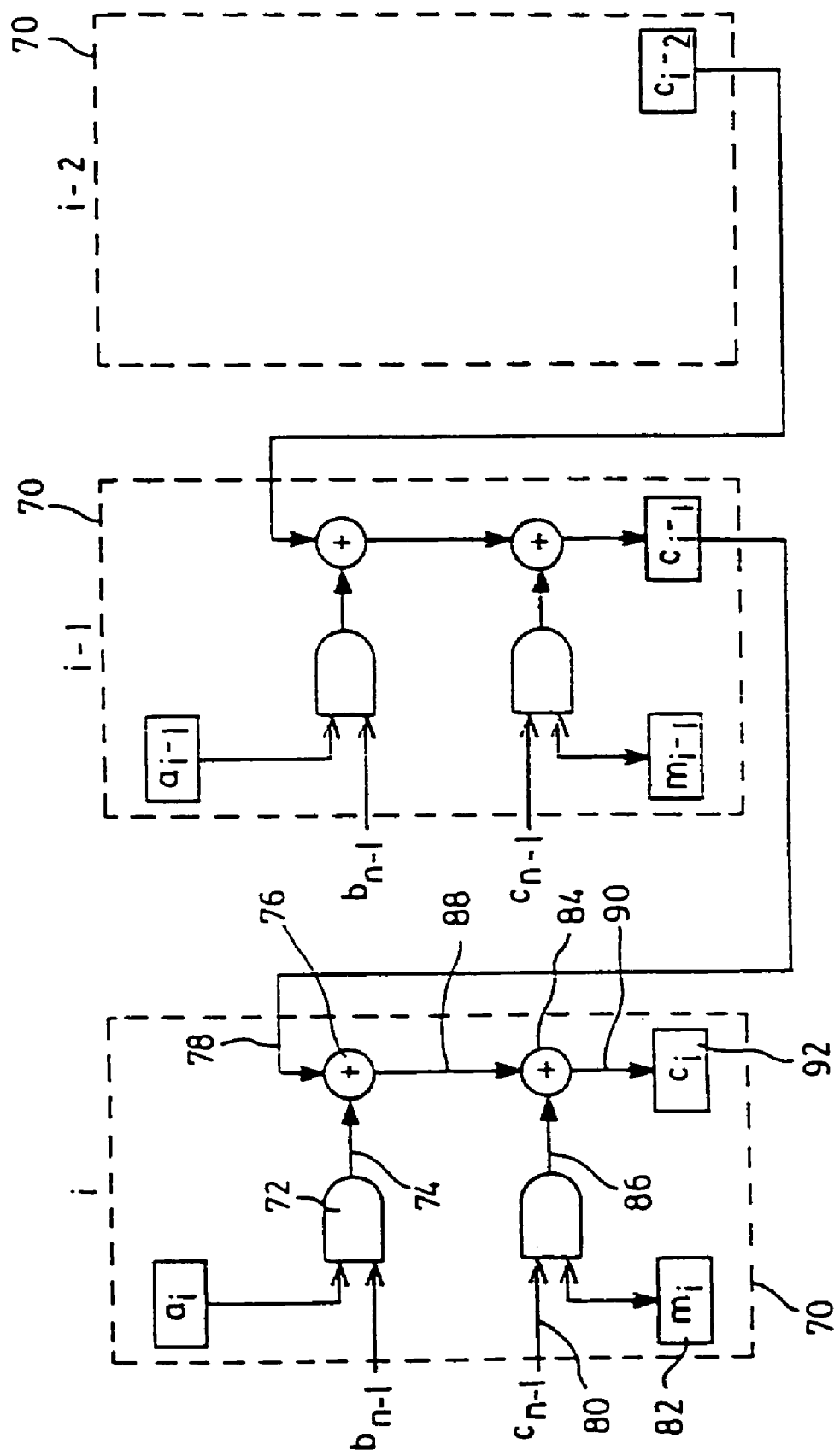
FIG. 6 is a circuit diagram of a finite-field multiplier of the bit-slice shown in FIG. 5.

Referring to FIG. 6, a detailed circuit implementation of the bit-slice 41 of FIG. 5 for finite field multiplication is indicated by numeral 70. Referring to bit-slice i, 70 of FIG. 6, (only three bit-slices are shown for the purpose of illustration in FIG. 6), the cell $a_i$ is ANDed with the add control signal $b_{n-1}$ by an AND gate 72. The output 74 of the AND gate 72 is connected to an input of an XOR gate 76 along with an input 78 from adjacent cell $C_{i-1}$ of the accumulator C. Thus implementing the calculation of the term "$c_{j-1}+b_i a_i$". The term "$c_{n-1} m_j$" is implemented by ANDing the signal $c_n$ 80 with $m_j$ 82 utilizing an AND gate 84. The output 86 of the AND gate 84 is connected to the input of an XOR gate 84, along with the output 88 of XOR gate 76. The output 90 of XOR gate 84 is connected to cell $C_i$ 92. Thus implementing the expression "$c_j=c_{j-1}+b_i(a_i)+c_{n-1}(m_j)$". With this general sequential multiplier, the product of two n-bit finite field elements will be produced in n clock cycles. It is preferable that a synchronous counter, that may be contained in the controller 20, provides control of the number of iterations. The preceding description applies to integer modular multiplication when adder 54 is a bit slice of an integer adder and adder 56 is a bit slice of an integer subtractor, as will be described later.

Addition

Although the circuitry has been described with reference to multiplication in a finite field $F_2^n$, other computational operations may also be performed with ease. Finite field addition has an advantage over integer arithmetic in that no carries are produced. The computation of a finite field sum requires only that an XOR gate be introduced at each cell of the registers in question since addition of two elements a and b in a finite field is simply a XOR b. Thus, referring back to FIG. 5, an input 100 is provided to the first adder 54 from cell $B_i$, and the second adder 56 is used for reduction. The output from adder 54 is then written directly into cell $C_i$. After the operands have been moved into registers a and b, the addition can be performed in a single clock cycle. It is also possible for the operation to be performed in the ALU and the result written back into a general register in the register file. For integer addition adder 54 is a bit slice of an integer adder and the result must be checked for modular overflow. If this condition arises adder 56 which is a bit slice of an integer subtractor is used to reduce the result.

Squaring

Squaring a number can be performed in the same time as multiplication of two different numbers. Squaring in a polynomial basis can be performed in a single clock cycle, if the specific irreducible along with the squaring expansion is explicitly hardwired. As an alternative squaring may be performed with multiplication of identical inputs.

Inversion

Inversion of finite field elements in $F_{2^n}$ may be performed using the extended Euclidean algorithm and utilizing four of the special purpose registers with additional control logic. This will be completed in 2n cycles if the shifting is made concurrently to the adds (which is easily implemented by hard wiring the outputs of the add to the next register cell).

Figure 7:
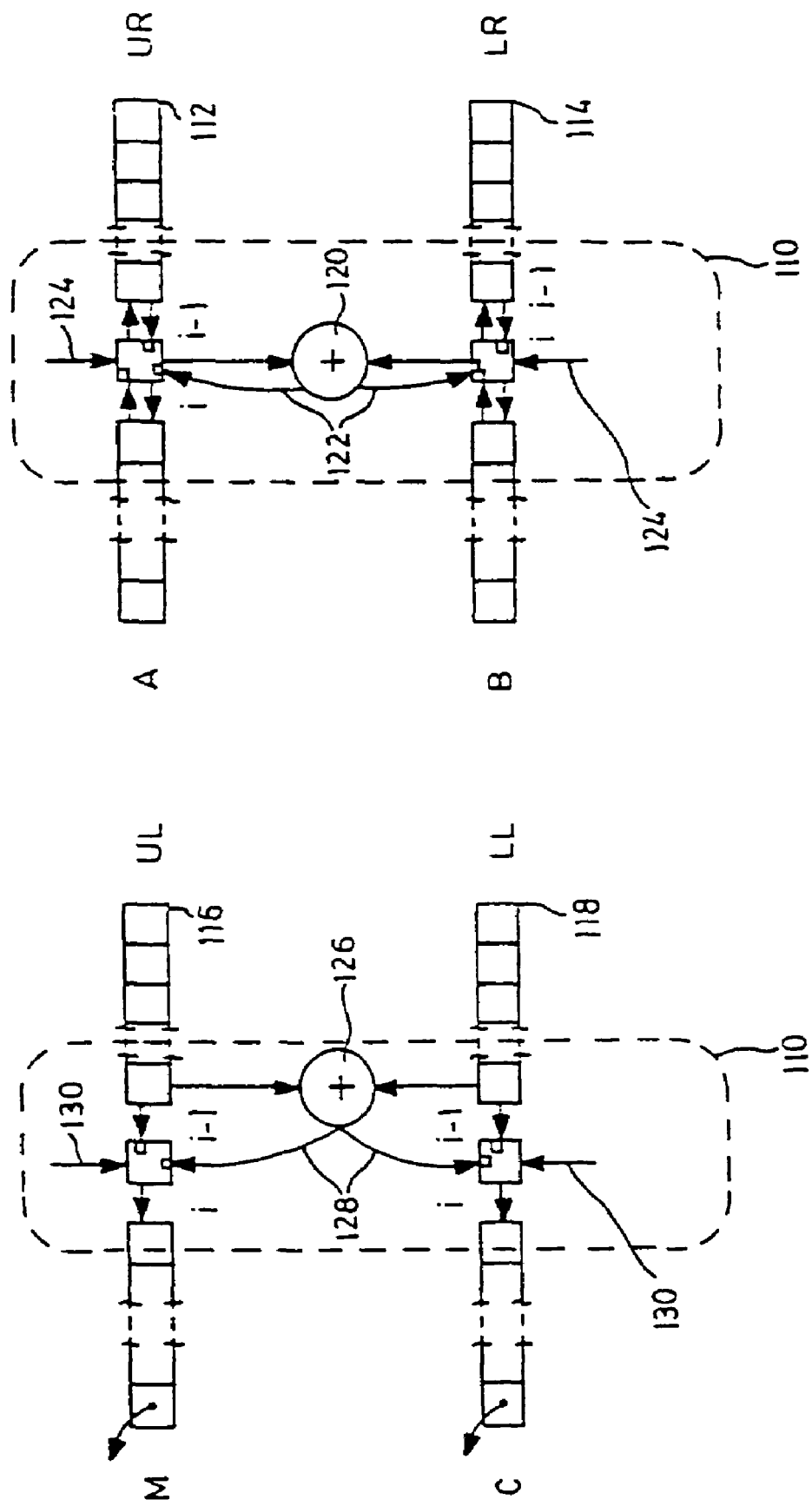
FIG. 7 is a block diagram of an arithmetic inverter.

The registers used in the inversion are A, B, M and C. For convenience these registers are schematically shown in FIG. 7 wherein they are assigned the following labels: M:UL; C:LL; A:UR; and B:LR. Once again the operation may be described with reference to a bit-slice 110.

The operands in an inversion are generally: an element to invert g; an irreducible polynomial f or modulus m (described later); a bit vector '0' and a bit vector '1.' The UL register 116 is loaded with f or m. The LL register 118 is loaded with g, the UR register 112 is loaded with '0' and the LR register 114 is loaded with '1'. For the UR and LR registers 112 and 114, respectively, cells $UR_i$ and $LR_i$ are XORed together by XOR gate 120 to produce an output 122. A control signal 124 determines whether one of three possible inputs is written in cell $UR_i$ and $UL_i$. The inputs are either a left or right shift from adjacent cells or the output 122. The control signal B determined by the state table to be described below. For the UL or LL registers 116 and 118, respectively, cells $UL_1$ and $LL_1$ are XORed together by XOR gate 126 to produce an output 128. A control signal 130 determines whether one of two possible inputs is written into cell $UL_i$ and $LL_i$. The inputs are either a left shift from the adjacent cell (i−1) or the output 128. Once again the control signal 130 is determined by the state table to be described below.

If we assume the control variables to be $k_u$—the length of the UL register and $k_l$—the length of the LL register. Then $\Delta = k_u - k_l$. The values $k_l$ and $k_u$ are implemented preferably with synchronous countdown counters, and $\Delta$ is implemented preferably with a synchronous up/down counter. Counter registers $k_u$, $k_l$ and $\Delta$ are also provided. The UL and LL registers are left shift registers while the UR and LR registers are both left and right shift registers.

Furthermore, for the count registers, $\Delta$ is loaded with 0, $k_u$ is initialized to n. A control bit latch provides a toggle function wherein a '1' designates an up count and a '0' designates a down count. The U/D control is initially set to '1.' Then a sequencer contained in the controller for performing the inversion in the ALU has the following outputs:

| | |
|---|---|
| deckl | Decrement $k_l$ kl |
| decku | Decrement $k_u$ ku |
| decDelta | Decrement $\Delta$ |
| incDelta | Increment $\Delta$ |
| toggle | Toggle UP/DOWN |
| lsUL | left-shift Upper Left register |
| lsLL | left-shift Lower Left register |
| lsUR | left-shift Upper Right register |
| lsLR | left-shift Lower Right register |
| rsUR | right-shift Upper Right register |
| rsLR | right-shift Lower Right register |
| outLR | Output Lower Right register |
| outUR | Output Upper Right register |
| dadd-lsLL | Down XOR and left-shift Lower Left register |
| uadd-lsUL | Up XOR and left-shift Upper Left register |

A state table outlining the action of the inverter follows, wherein $M_u$ and $C_1$ are the upper bit of registers UL and LL respectively and wherein $M_u$ and $C_1$ determine the current state. When an action is performed on the registers and counters which places the inverter in a new state. The process is repeated until either $k_u$ or $k_l$ are zero and one of the right register RL or RU will contain $g^{-1}$, the other will contain the modulus itself, which may be restored to register m for use in multiplication or inversion operations to follow.

| U/D | $k_u$ | $k_l$ | $\Delta$ | $M_u$ | $C_1$ | Action |
|---|---|---|---|---|---|---|
| X | 0 | X | X | X | X | OutLR |
| X | X | 0 | X | X | X | OutUR |
| 1 | $\bar{0}$ | $\bar{0}$ | 0 | 0 | 1 | $Deck_u$, dec $\Delta$, lsUL, lsUR, toggle |
| 1 | $\bar{0}$ | $\bar{0}$ | $\bar{0}$ | 0 | 1 | $Deck_u$, dec $\Delta$, lsUL, rsLR |
| 0 | $\bar{0}$ | $\bar{0}$ | X | 0 | 1 | $Deck_u$, dec $\Delta$, lsUL, lsUR |
| 0 | $\bar{0}$ | $\bar{0}$ | 0 | 1 | 0 | $Deck_l$, inc $\Delta$, lsLL, lsLR toggle |
| 0 | $\bar{0}$ | $\bar{0}$ | $\bar{0}$ | 1 | 0 | $Deck_l$, inc $\Delta$, lsLL, rsUR |
| 1 | $\bar{0}$ | $\bar{0}$ | X | 1 | 0 | $Deck_l$, inc $\Delta$, lsLL, lsLR |
| 0 | $\bar{0}$ | $\bar{0}$ | 0 | 1 | 1 | $Deck_l$, inc $\Delta$, Dadd-lsLL, lsLR, toggle |
| 0 | $\bar{0}$ | $\bar{0}$ | $\bar{0}$ | 1 | 1 | $Deck_l$, inc $\Delta$, Dadd-lsLL, rsUR |
| 1 | $\bar{0}$ | $\bar{0}$ | 0 | 1 | 1 | $Deck_u$, dec $\Delta$, Uadd-lsUL, lsUR, toggle |
| 1 | $\bar{0}$ | $\bar{0}$ | $\bar{0}$ | 1 | 1 | $Deck_u$, dec $\Delta$, Uadd-lsUL, rsLR |

Integer Arithmetic

The extreme similarity of polynomial and integer representations allows for the sharing of hardware in the ALU. For addition, the integer arithmetic is only complicated by the requirement for carries. The integer arithmetic operations of the ALU are best illustrated by way of example utilizing a multiplication operation.

Multiplication in Z is illustrated by way of reference to the following sequence of steps represented in pseudo-code, wherein as earlier, a and b are bit vectors to be multiplied and c is the product of a and b, and wherein $c=(c_0, c_1, \ldots c_{n-1})$

```
C=0
M=0
For i from 0 to n−1 do
    C^{ext} ← C
    For j from 0 to n−1 do
        Cj = (b_i (a_j) + m_j + c_j) mod 2
        M_{j+1}=(b_j(a_j) + m_j + c_j) / 2
And where
    C^{ext} ← C: For j from n−1 to 0 do
        c_{j−1} = c_j
        c_{j−1}^{ext} = c_j^{ext}
```

Analogously, this may be used to invert integers modulo p if the XOR's are replaced with subtractors and the m register is loaded with the prime. As a refinement carry—save methods may be employed to delay carry propagation.

It may be observed that the bit-slices 70 for finite field multiplication illustrated in the embodiment of FIG. 6, may be modified to include multiplication for integer representations. It may also be noted that for integer multiplication, the registers are loaded with the bit vectors in reverse order from that of $F_2m$ i.e. the leftmost cell of a register contains the LSB of the bit vector. In integer number multiplication, it is necessary to implement carries between successive partial products, furthermore as the partial products are not being reduced by a modulus the carries from the addition of successive partial products must be provided for. Thus the accumulator register C is extended and a new register $C^{ext}$ 49 is provided as shown in FIG. 5. Before each partial product is formed, the lowest bit of the accumulator C (cell $C_M$) is shifted into the topmost bit of the extension register $C^{ext}$ (cell $C^{ext}_1$) and then both the accumulator C and $C^{ext}$ are shifted toward the LSB by one bit. The final result is obtained in C and $C^{ext}$, wherein $C^{ext}$ contains the low order bits of the product. This is represented by the operation $C^{ext} \leftarrow C$ above.

Figure 8:
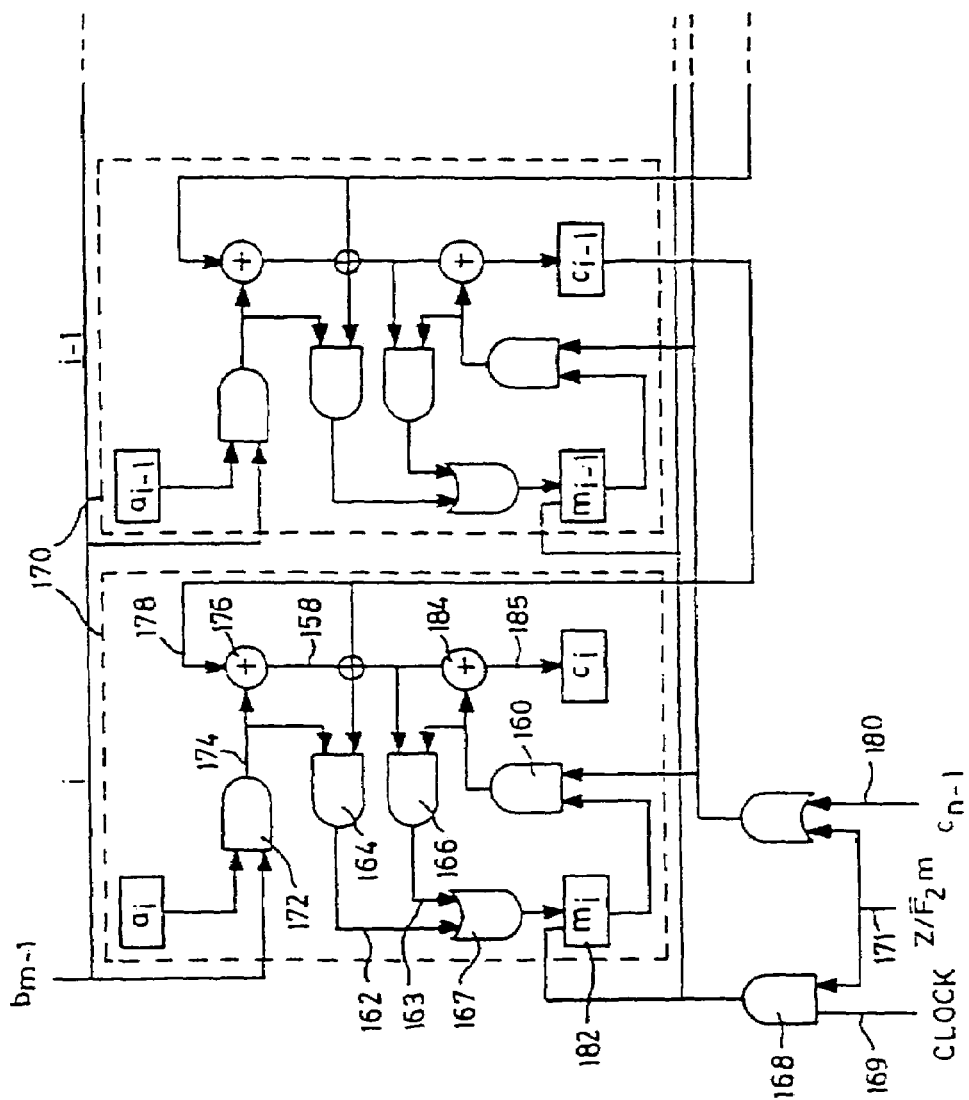
FIG. 8 is a circuit diagram of a combined finite-field/integer multiplier.

Referring now to FIG. 8, a bit-slice 170 is shown, and which is similar to the bit-slice 70 of FIG. 6. Accordingly the reference numerals used in the description of FIG. 6 will be used to identify like components with a prefix 100 added i.e. reference numeral 70 will become 170. The arrangement of FIG. 8 differs from FIG. 6 in two important ways; the modulus register m is used as a carry register, and a mode selection signal Z $F_2m$ 171 is provided.

Now the terms $c_j = c_{j-1} + b_i a_i + c_{n-1} m_j$ are implemented as before for the finite field multiplication with the product of the control signal $b_m$ and the contents of register cell $A_i$, implemented by AND gate 172. The output 174 of the AND gate 172 is XORed with the contents of register cell $c_{j-1}$ by XOR gate 176 to produce an output term $c_{j-1} + b_i(a_i)$ indicated by numeral 158. This output signal is XORed using XOR gate 184 with the term '$c_{n-1}(m_j)$' indicated by numeral 185, derived from the AND gate 160 to produce the term $c_j$. In addition, a carry term $m_i$ is produced from the sum of the respective products '$b_i(a_i).c_{j-1}$' 162 and '$c_{j-1} + b_i a_i . m_j$' 163 and written into cell $m_i$ 182. The product terms 162 and 163 are implemented by AND gates 164 and 166 respectively. The sum of the terms 162 and 163 are implemented by OR gate 167.

The mode selection signal Z 171, is ORed with the carry input signal $c_n$ 180 and Is also ANDed 168 with clock signal 169. Thus by setting Z=0, will implement finite field arithmetic and by setting Z=1 will implement integer arithmetic.

Thus the modifications necessary to convert the finite field multiplier given previously in FIG. 6 into a combined finite field/integer multiplier are shown in FIG. 8. Note that the output register C is extended to collect the low order bits of the multiplication. As computations in Z are performed without a modulus, The modulus register M is not used to reduce the partial products but as a holder of the carries. The control signal $Z/F_2^M$ 171 enables the integer multiplication circuitry for the ALU.

A final carry propagation may be provided by a Manchester ripple chain, possibly extended by a carry-skip mechanism of one or two layers owing to the long register length. It is also possible to clock for n more cycles, allowing the carry save adders to completely merge the carries.

Two's complement subtraction can be implemented in the carry propagation adder provided that one input can be conditionally complemented at its input and that a 'hot' carry-in is made at the LSB of the adder.

When multiplying, the ripple-carry will be intolerable even if improved by the carry-skip, but this carry propagation can be almost entirely removed by using a carry-save adder, which provides a redundant representation of the partial product, which is only resolved after the multiplication is complete.

Figure 9:
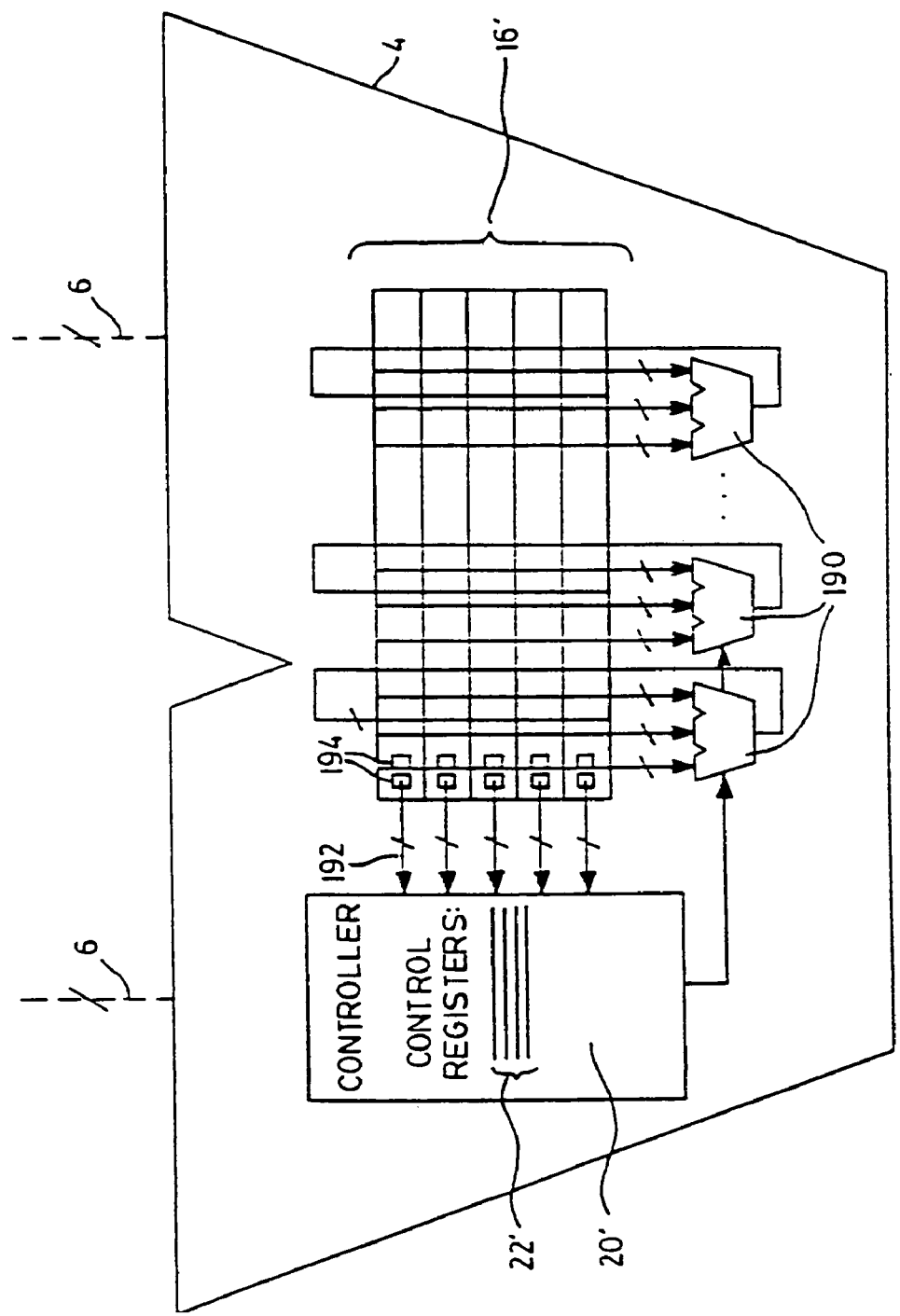
FIG. 9 is a block schematic diagram showing an embodiment of a multi-bit ALU of FIG. 1.

In a further embodiment the ALU 4 may be modified to provide a linear increase in computation speed as shown in FIG. 9. This is achieved by processing consecutive bits from the special-purpose registers 16' at once, and implementing additional circuitry indicated by the modified sub ALU's 190 to process the incremental additions as schematically illustrated in FIG. 9. Processing multiple bits then results in a linear increase in speed. For example, where a computation is performed sequentially two or more steps in the sequence may be performed simultaneously. In this case the controller 20' will process two or more control bits 194 from the special-purpose registers 16', and the inputs 192 to the controller are indicated in FIG. 9 as multi-bit lines.

Figure 10:
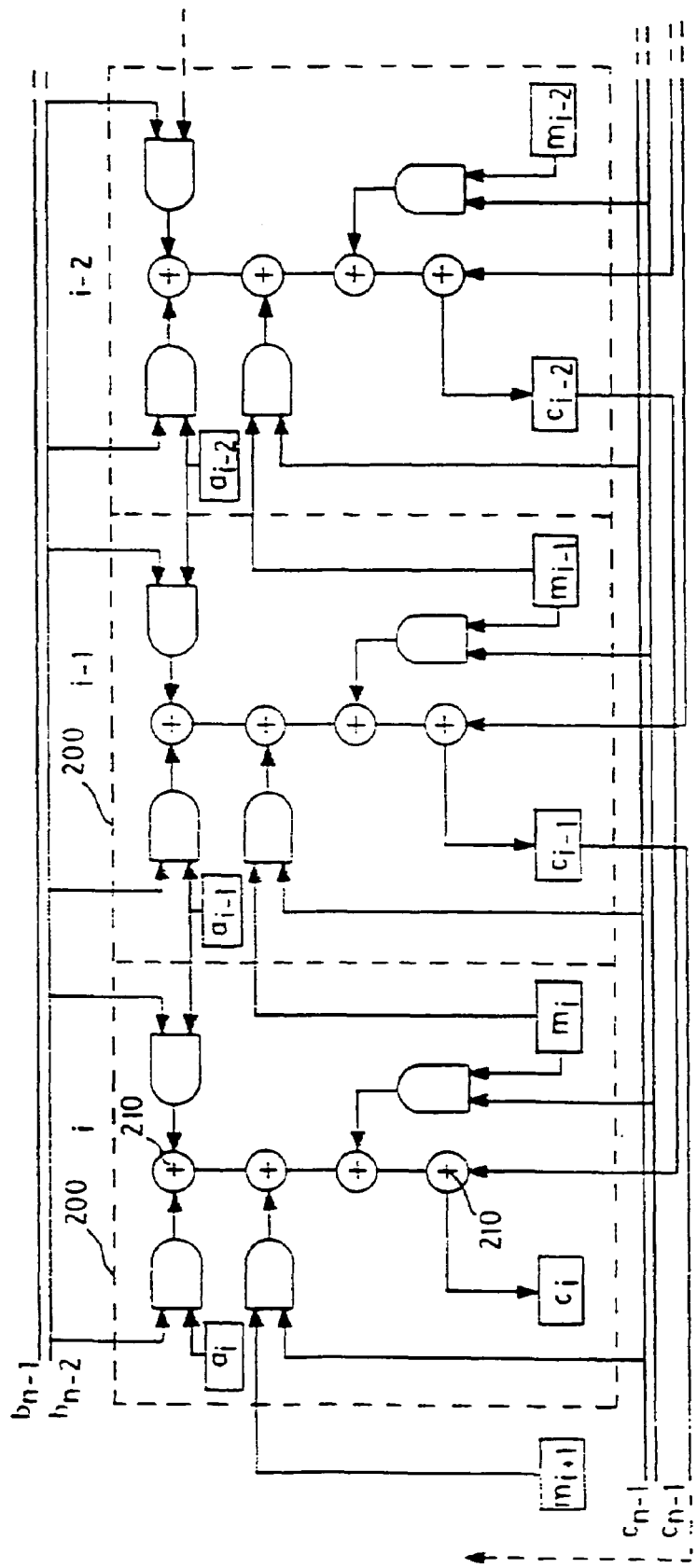
FIG. 10 is a circuit diagram of the multi-bit finite-field multiplier of FIG. 9.

A circuit diagram of a two-bit at a time multiplier for finite fields is shown in FIG. 10. In this implementation, the bit-slices 200 have twice the number of XOR gates 210, implementing two terms of the addition, the circuit takes two bits of multipliers and adds in two adjacent shifts of the multicand $a_i$ and $a_{i-1}$, and reduces with two adjacent shifts of the modulus $M_I$ and $M_{i-1}$. This has the effect of simultaneously producing two consecutive partial products with modulus reduction, thus having the total computation time.

It should also be noted that the top-bits of the special-purpose registers are used as control bits for the controllers 20' or 20. This has the advantage that when the operands are loaded into the registers, they are aligned left; thus control is always obtained from a fixed bit location. However, other bits may be used as a control bits, e.g. the bottom bits; however, this may additionally increase the complexity of the hardware.

Again, multi-bit operation potentially providing improved linear increase in computation speed, since such options as Booth (or modified-Booth) recoding become possible.

It is assumed that the ALU will also be able to perform simple arithmetic operations on general registers. An alternative is to have all arithmetic performed on ALU internal registers, with the general-purpose registers able only to read and write these registers.

The functionality of the ALU will include integer addition, utilizing some carry propagation method, such as a ripple carry or the combination of carry skip addition and carry completion.

The ALU will also provide simple XOR functionality for use in finite field addition. Since the integer and finite field representations (bit orders) are reversed, it is beneficial to provide a bit reversal mechanism for use in field to integer and integer to field conversions. The tops of two shift registers are connected to provide for this facility in n clock cycles, where n is the length of the arithmetic operands.

The general architecture given here has the potential not only to share the register file between EC and modular exponential arithmetic, but also to share special purpose registers and even combinational logic, in addition to shared control registers.

While the invention has been described in connection with a specific embodiment thereof and in a specific use, various modifications thereof will occur to those skilled in the art without departing from the spirit of the invention. For example it may be noted that in the embodiments described, reference is made to specific logic circuits, however equivalent circuits may be used, for example by using de Morgans Rule or if inverted logic is implemented then complementary circuits may be used. In addition, when referring to the orientation of the registers and bit vectors, i.e. left, right, top, bottom, other arrangements of these directions are also implied.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the invention.

The invention claimed is:

1. An arithmetic processor for performing cryptographic operations comprising:
   a) an arithmetic logic unit (ALU) containing arithmetic circuitry configured to perform field operations in an underlying field, said circuitry comprising a first controller for sequencing said ALU through steps in said field operations;
   b) a register file comprising one or more general purpose registers to contain representations of one or more operands; and
   c) a second controller to provide instructions to said ALU for controlling computational operations of said ALU on said one or more operands, said second controller co-operating with said first controller to control operations of said ALU to accommodate different operand vector sizes in response to variations in size of said underlying field indicated by a field size control signal received by said second controller;
   wherein said first controller monitors control bits and implements a counter in its own control registers for determining the size of a field being used.

2. The processor according to claim 1, wherein said arithmetic circuitry comprises shared finite field and integer arithmetic circuitry and said second controller receives a mode selection control for selecting between either finite field computations or modular integer computations.

3. The processor according to claim 1, wherein said one or more general purpose registers are chosen to have a width large enough to handle a largest foreseeable field size.

4. The processor according to claim 1, wherein said arithmetic circuitry comprises at least one special purpose register, a plurality of sub-ALUs connected thereto by one or more bit input data buses, said at least one special purpose register having one of said control bits be monitored by said first controller to determine the size of a field being used, wherein said first controller communicates with said second controller using a control for sequencing said ALU through steps in said computational operations.

5. The processor according to claim 4 wherein said at least one special purpose register has a length greater than said representation and padding is added adjacent the least significant bit of said representation to fill said at least one special purpose register.

6. The processor according to claim 5 wherein said control bits are located in each said at least one special purpose register adjacent the most significant bit of said representation.

7. The processor according to claim 4 wherein each said at least one special purpose register has a length greater than said representation and padding is added adjacent the least significant bit of said representation to fill each said at least one special purpose register.

8. The processor according to claim 7 wherein said control bits are located in each said at least one special purpose register adjacent the most significant bit of said representation.

9. The processor according to claim 1, wherein said ALU is embodied as a separate finite field ALU and integer ALU, said finite field ALU configured to perform finite field operations in an underlying field and said integer ALU configured to perform integer modular arithmetic; each said ALU containing at least one special purpose register, a plurality of sub-ALUs connected thereto by one or more bit input data buses, and a sub-controller; said at least one special purpose register in said finite field ALU having one of said control bits be monitored by said sub-controller to determine the size of a field being used; and wherein each said sub-controller co-operates with said second controller using separate controls for sequencing said ALUs through steps in said computational operations.

10. The processor according to claim 9, wherein said second controller receives a mode selection control for selecting between either finite field computations or modular integer computations, said second controller operating said controls according to said mode selection control.

11. The processor according to claim 9, wherein said general purpose registers are chosen to have a width large enough to handle a largest foreseeable field size.

* * * * *